April 22, 1958     R. S. BRESCKA ET AL     2,831,346
PLATING ADHERENCE TESTER
Filed Sept. 27, 1955
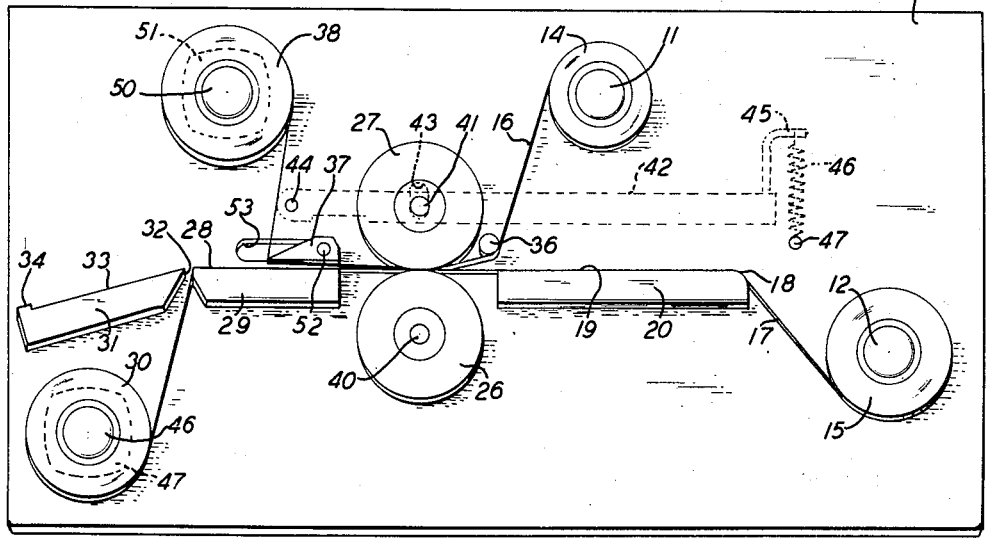
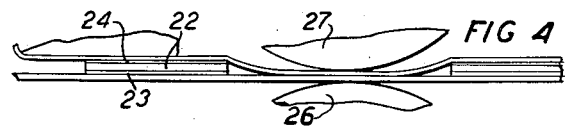
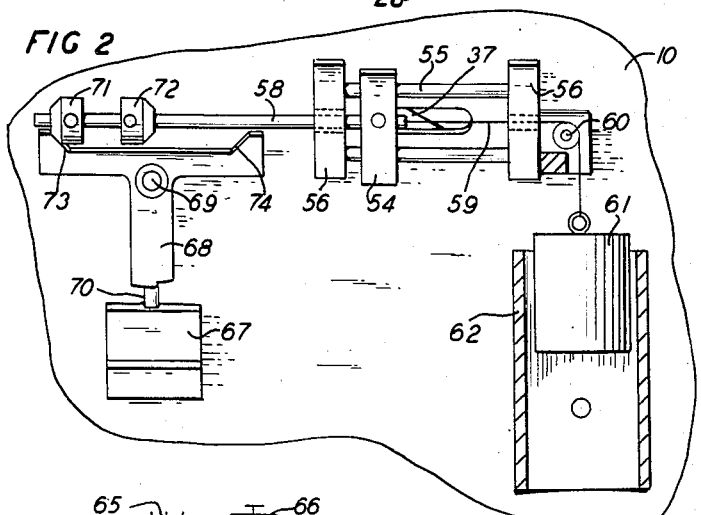
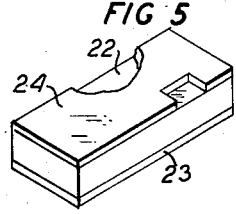
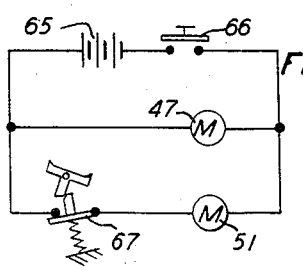
INVENTORS
R. S. BRESCKA
H. W. CLIFFORD
R. L. MOORE
BY *W. A. Johnson*
ATTORNEY

2,831,346

PLATING ADHERENCE TESTER

Rudolph S. Brescka, Irvington, Harry W. Clifford, East Orange, and Robert L. Moore, Elizabeth, N. J., assignors to Western Electric Company, Incorporated, New York, N. Y., a corporation of New York Application September 27, 1955, Serial No. 536,964

8 Claims. (Cl. 73—150)

This invention relates to adherence testing apparatus, particularly plating adherence testers for testing the adherence of coatings of, for example, precious metals on articles such as crystals.

During certain steps in the process of manufacturing quartz crystal units, the opposing surfaces of the crystals are vapor plated with conductive material such as gold or silver. To determine the efficiency of the plating process and more particularly to determine the conditions of the plated surfaces resulting therefrom it is desirable to test the adherence of the materials on the crystals. In the past, certain methods have been practiced depending largely upon the skills of the operators, which varied, producing inaccurate results in certain instances.

It has been found that an adhesive tape may be employed to test the adherence of materials on articles, but the results obtained in using such tapes vary with the amount of pressure applied to the tape in forcing it against a plated surface of an article and also with the speed at which the tape is removed to pull off any portions of the plating material not adhering properly to the article.

The object of the present invention is a plating adherence tester which, although simple in structure, is highly efficient in testing the adherence of coatings of materials on articles.

In the present embodiment of the invention, the plating adherence tester includes means to rotatably support a supply of tape having adhesive material on one side thereof, means to move the tape longitudinally in a given path and means disposed adjacent the path to force the adhesive side of the tape under a predetermined pressure into engagement with the plated surface of an article to be tested, after which the tape is caused to separate from the article and thereby remove any of the material which has not adhered satisfactorily to the article.

More specifically, two adhesive tapes are advanced from supplies by motor driven takeup drums, one driven at a constant speed while the other is under the control of an element and associated means to assure constant travel of the tapes between rubber faced pressure rollers where the tapes are forced under a predetermined pressure in engagement with the adjacent plated surfaces of the successive articles.

Other objects and advantages will be apparent from the following detailed description when considered in conjunction with the accompanying drawing, wherein:

Fig. 1 is a front elevational view of the plating adherence tester;

Fig. 2 is a fragmentary rear elevational view of a portion of the tester showing the major portion of the tape control means;

Fig. 3 is a schematic illustration of the electrical control for the tester;

Fig. 4 is an enlarged longitudinal sectional view of the tapes with successive articles disposed therebetween, and Fig. 5 is an enlarged isometric view of one of the articles illustrating a possible result of the testing operation.

Fig. 1 of the drawing appears to be an isometric view of the tester but the panel-like frame 10 including additional structure (not shown) is supported so that it tilts back at an angle from the operator. Rotatable supports 11 and 12 commercially known as needle bearings are mounted on the panel 10 at positions shown. Supplies 14 and 15 of tapes 16 and 17, having their inner surfaces supplied with like adhesive materials, are mounted on the supports 11 and 12. The tape 17 is directed around a curved end 18 and over the top surface 19 of a table 20 where articles, such as crystals 22 having plated surfaces 23 and 24, may be placed successively on the tape 17. The tape 17 continues between rubber faced pressure rolls 26 and 27, over the top surface 28 of a guide 29 and then down at a sharp angle to a takeup drum 30 where its leading end is secured in any suitable manner. A member 31 mounted upon the panel 10 with the guide 29 is positioned a predetermined distance therefrom so that its edge 32 will be positioned adjacent the path of the successive articles to serve in separating them from the tape 17 as the tape changes its path of travel into the sharp angular path from the plane of the surfaces 19 and 28. The member 31 has a slanting surface 33 with a stop 34 to receive the successive articles and from which the operator may remove the articles after they have passed through the tester.

The tape 16 when leaving the supply 14 travels around a guide roller 36, spaced from the path of the tape 17, after which the tape 16 will travel beneath the roller 27, an element 37 and upwardly to a drum 38 where its leading end will be secured. The roller 26 is rotatably mounted on a spindle 40 carried by the panel 10 so that the path of the tapes 16 and 17 will be substantially tangent to the periphery of the roller. The roller 27 is supported by a spindle 41 mounted upon a lever 42 and extending through an elongate aperture 43 in the panel 10. One end of the lever 42 is pivoted at 44 while the other end supports an arm 45 connected to one end of a spring 46, the other end of the spring being connected at 47 to a pin carried by the panel 10. Through this means, a predetermined pressure is supplied to the roller 27, forcing it toward the roller 26, resulting in the application of a predetermined pressure to both tapes and forcing them into engagement with the plated surfaces 23 and 24 of the successive articles.

The drum 30 is mounted upon a shaft 46 of a constant speed of electric motor 47 adapted when energized to cause advancement of the tape 17 at a given speed. The motor 47 is mounted on the back of the panel 10 with the shaft extending through an aperture in the panel. It is important that the tapes 16 and 17 travel at like speeds particularly during the interval when the tapes are forced to adhere to each other and to the articles positioned therebetween. Therefore, it is necessary to control the advancement of the tape 16 to assure this result. The drum 38 for the tape 16 is mounted upon a shaft 50 of a motor 51 which is mounted on the back of the panel with the shaft extending through an aperture therein. The element 37 (Figs. 1 and 2) is mounted upon a rod 52 extending through an elongate aperture 53 in the panel 10 where it is supported by a slide 54. The slide 54, disposed back of the panel 10 is supported by parallel bars 55 which have their ends mounted in blocks 56 fixed to the panel. A rod 58 extending through an aperture in one of the blocks 56 extends through and is fixed in an aperture in the slide 54. The rod 58 has one end secured to one end of a cable 59 which extends around a pulley 60 and downwardly to a position where its other end is secured to a weight 61. The weight 61 is substantially housed in a cylinder 62, mounted upon the back of the panel 10, which serves to guide the weight in its movement. The weight 61 normally urges the element 37 to the right (Fig. 2) or to the left (Fig. 1) so that it will be under the control of tape 16 in this area of the apparatus and be affected by variations in the advancements of the tapes.

Attention is directed to the circuit shown in Fig. 3 which illustrates a source of electrical energy 65 for the motors 47 and 51. A start switch 66 when enclosed will complete circuits for the motors, the motor 47 being energized continuously to advance the tape 17 until the switch 66 is open, while the motor 55 for advancing the tape 16 is under the control of a normally closed switch 67. Referring now to Figs. 2 and 3, it will be noted that the switch 67 is under the control of a T-shaped cam 68, pivotally supported at 69 on the back of the panel and having its lower surface 70 positioned to actuate the switch 67 into open position. The cam 67 is under the control of actuating members 71 and 72, mounted at predetermined variable positions on the rod 58, to engage surfaces 73 and 74 of the cam. It is intended that the tape 16 advance uniformly with the tape 17 through the gaging area. To assure this result, the advancing means for the tape 16 must be arranged to advance the tape slightly faster than the tape 17. This may be accomplished by a faster running motor or a larger drum than those for the tape 17. When the motor 51 has caused the drum 38 to pull the tape 16 to move the control element 37 to the right (Fig. 1) to the position where the member 71 will engage the surface 73 of the cam 68 and force it into the position shown in Fig. 2, the switch 67 will be opened, de-energizing the motor 51. The motor 51 will remain de-energized until the tape 16, advanced through the testing area with the tape 17, allows the control element 37 to move to the left (Fig. 1) or to the right (Fig. 2), until the member 72 engages the surface 74 and moves the cam 68 free of the switch 67, allowing it to close to again energize the motor 51.

During operation of the apparatus, let it be assumed that full supplies 14 and 15 of tapes 16 and 17 have been mounted on their rotatable supports 11 and 12 and that the leading ends of the tapes are threaded through the gaging area and connected to the drums 30 and 38. During this threading operation the roller 27 may be moved free of the roller 26. By closing switch 66, the tester may be set in operation and continue in operation as long as it is desirable to feed articles to be tested thereto. These articles may be placed readily upon the inner adhesive surface of the tape 17 in the area of the table 20 after which the articles will be moved in the path between the pressure rollers 26 and 27 where the upper tape 16 with its inner adhesive surface will be brought into engagement with the successive articles. A predetermined uniform pressure is applied to the tapes 16 and 17 engaging the plated surfaces 23 and 24 of each article as they pass between the rollers 26 and 27. As the tape 16 passes around the far edge of the control element 37, it is removed from the surface 24 of each article causing each article to travel on with the tape 17 until it reaches the end of the guide 29. At the point where the tape 17 changes its direction of travel at a sharp angle to the former plane of travel, it will be separated from the plated surface 23 causing the article to continue on over the member 31 and come to rest on the surface 33 thereof.

One of the important features is the assurance of the application of predetermined uniform pressures through the tapes to the opposing surfaces of the article and the removal of the tapes at predetermined speeds to perform the desired testing steps on the plated articles. The position of the element 37 a given distance above the member 29 starts the removal of the tape 16 from the article and from the tape 17 prior to reaching the end of the element.

Although the advancing means for the tape 16 is described as being faster than that for the tape 17, the faster speed for the tape 16 exists only between the control element 37 and the drum 38. The speeds of removal of the tapes from the articles are substantially identical. Therefore, stopping and starting of the motor 51 under the control of the element 37 through the mechanism shown in Fig. 2 will vary the speed of travel of the tape 16 adjacent the takeup to assure possibility of the tapes 16 and 17 travelling at like speeds during the intervals they are adhering to each other and particularly when the tape 16 is adhering to the articles.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A plating adherence tester comprising means to rotatably support a supply of tape having adhesive material on one side thereof, means to move the tape continuously longitudinally in a given path, means disposed adjacent the path to force the adhesive side of the tape under a predetermined pressure into close engagement with a plated surface of an article to be tested while moving with the tape, and means to cause separation of the article and tape during continuous longitudinal movement of the article with the tape.

2. A plating adherence tester comprising means to rotatably support supplies of tapes having adhesive material on inner sides thereof, separate means to move the tapes continuously longitudinally in given paths, means disposed adjacent the paths to force the tapes toward each other to force their inner adhesive sides under predetermined like pressures into engagement with opposing plated surfaces of an article to be tested while moving with the tapes, and means to cause separation of the tapes from each other and the article during continuous longitudinal movement of the article with the tapes.

3. A plating adherence tester comprising means to rotatably support supplies of tapes having adhesive material on the inner sides thereof, separate means to move the tapes continuously longitudinally in given paths, means disposed adjacent the paths to force the tapes toward each other to force their inner adhesive sides under predetermined like pressures into engagement with opposing plated surfaces of an article to be tested while moving with the tapes, means to cause separation of the tapes from each other, and means to restrain movement of the article in the direction of separation of the tapes.

4. A plating adherence tester comprising means to rotatably support supplies of tapes having adhesive material on the inner sides thereof, separate means to move the tapes continuously longitudinally in given path, rollers disposed on opposite sides of the path, means to cause the rollers to force the tapes toward each other to force their inner adhesive sides under predetermined like pressures into engagement with opposing plated surfaces of an article to be tested, and means to cause separation of the tapes from each other and the article during continuous longitudinal movement of the article and the tapes.

5. A plating adherence tester comprising means to rotatably support two supplies of tapes each having adhesive material on one side thereof, separate means to move the tapes continuously longitudinally through a testing position with the adhesive sides thereof facing each other to receive successive articles with opposing plated surfaces therebetween, means to apply like pressures to the tapes as they move the articles through the testing position to cause the tapes to adhere to the plated surfaces of the articles, and separate means to cause the removal of the tapes from the successive articles.

6. A plating adherence tester comprising means to rotatably support two supplies of tapes each having adhesive material on one side thereof, separate means to move the tapes continuously longitudinally through a testing position with the adhesive sides thereof facing each other to receive successive articles with opposing plated surfaces therebetween, means to apply like pressures to the tapes as they move the articles through the testing position to cause the tapes to adhere to the plated surfaces of the articles, one of the tape moving means including a continuously operable takeup to advance a first one of the tapes at a predetermined speed through the testing position and to advance the remaining second tape therewith through the testing position, the other tape moving means including a normally operable takeup for the second tape adapted to advance the second tape after leaving the testing position faster than the first tape, and means under the control of the second tape to cause intermittent stopping and starting of the takeup therefor.

7. A plating adherence tester comprising means to rotatably support two supplies of tapes each having adhesive material on one side thereof, separate means to move the tapes continuously longitudinally through a testing position with the adhesive sides thereof facing each other to receive successive articles with opposing plated surfaces therebetween, means to apply like pressures to the tapes as they move the articles through the testing position to cause the tapes to adhere to the plated surfaces of the articles, one of the tape moving means including a continuously operable takeup to advance a first one of the tapes at a predetermined speed through the testing position and to advance the remaining second tape therewith through the testing position, the other tape moving means including a normally operable takeup for the second tape adapted to advance the second tape after leaving the testing position faster than the first tape, an element normally urged in one direction when the takeup for the second tape is unoperated and movable in a reverse direction by the second tape when said takeup is operated, and means actuated by the element when moved a given distance in said one direction to cause operation of the takeup for the second tape.

8. A plating adherence tester comprising means to rotatably support two supplies of tapes each having adhesive material on one side thereof, separate means to move the tapes continuously longitudinally through a testing position with the adhesive sides thereof facing each other to receive successive articles with opposing plated surfaces therebetween, means to apply like pressures to the tapes as they move the articles through the testing position to cause the tapes to adhere to the plated surfaces of the articles, one of the tape moving means including a continuously operable takeup to advance a first one of the tapes at a predetermined speed through the testing position and to advance the remaining second tape therewith through the testing position, the other tape moving means including a normally operable takeup for the second tape adapted to advance the second tape after leaving the gaging position faster than the first tape, an element normally urged in one direction when the takeup for the second tape is unoperated and movable in a reverse direction by the second tape when said takeup is operated, means actuated by the element when moved a given distance in said one direction to cause operation of the takeup for the second tape, and means actuated by the element when moved a given distance by the second tape in said reverse direction to cause the takeup for the second tape to be unoperated.

References Cited in the file of this patent

UNITED STATES PATENTS

| | | |
|---|---|---|
| 2,051,464 | Bradner | Aug. 18, 1936 |
| 2,406,989 | Bonner | Sept. 3, 1946 |
| 2,415,442 | Rackett | Feb. 11, 1947 |
| 2,598,892 | Critchlow | June 3, 1952 |
| 2,604,783 | Herrlinger | July 29, 1952 |